2,870,776

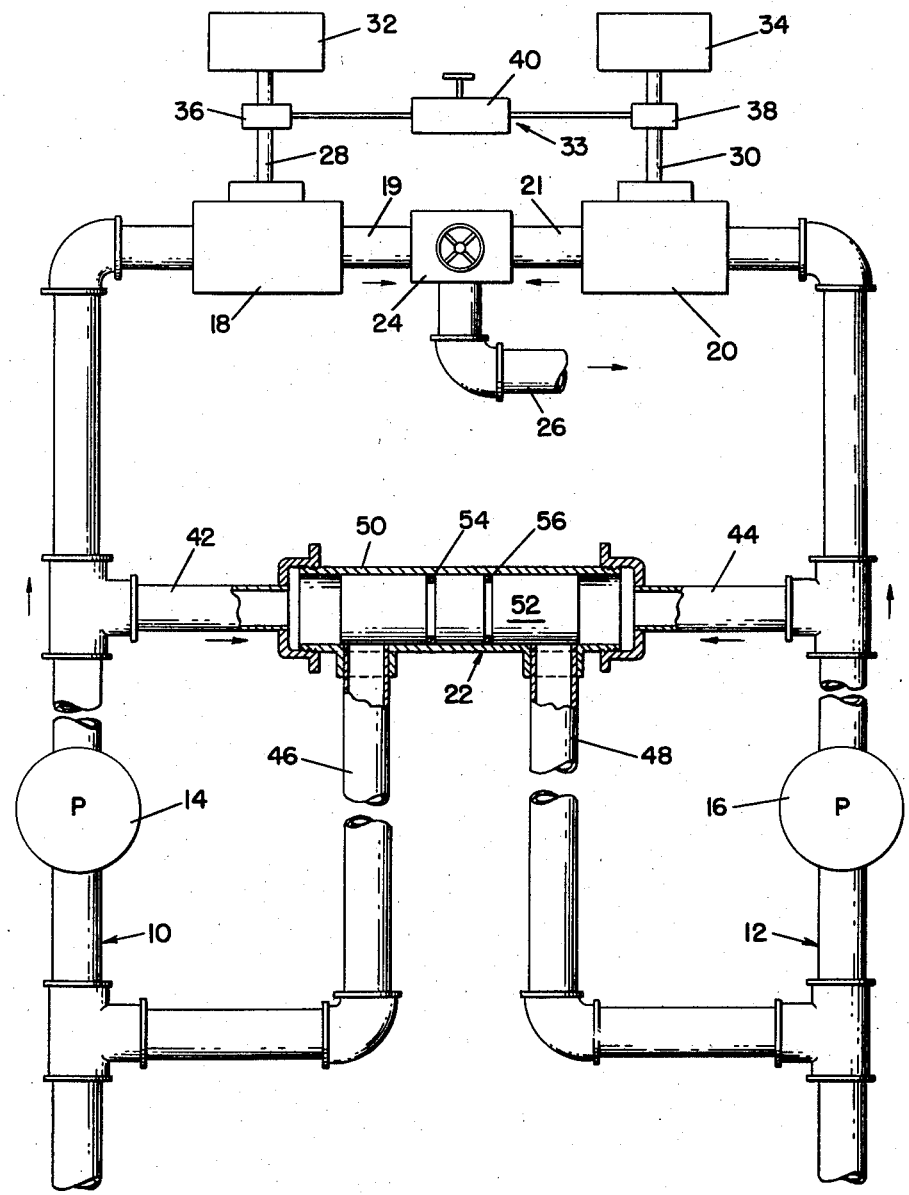
*INVENTOR.*
ALFRED H. MARSH

LIQUID PROPORTIONING SYSTEM

Alfred H. Marsh, Swarthmore, Pa., assignor to Sun Oil Company, Philadelphia, Pa., a corporation of New Jersey Application June 21, 1954, Serial No. 437,918

6 Claims. (Cl. 137—99)

This invention relates, in general, to apparatus for mixing liquids in desired proportions, and more particularly to such apparatus wherein the pressures of the liquids to be mixed are a controlling factor.

Mixing liquids in predetermined quantities as required in certain industries and chemical operations is performed in many ways depending on the condition of the liquids to be blended. Where a constantly flowing stream of two blended liquids, mixed in exact proportions, is desired, a very complicated and expensive system is required.

The primary object of the present invention is, therefore, to provide an inexpensive device adapted to combine two flowing liquids accurately and constantly in predetermined proportions during the mixing operation.

In accordance with the present invention, the two liquids to be blended are delivered to separate positive acting volumetric meters. These meters are connected together to control the volumes of liquid passed through each of them in inverse proportion to the volume of liquid passed by the connected meter. Preliminary to presenting the liquids to their respective meters, the separate liquid delivery systems are hydraulically connected so as to present exactly balanced pressures to the inlet ports of the volumetric meters and the outlet ports of the meters are connected to provide uniform pressure on the discharge side. A vernier adjustment in the form of a manually adjustable mixing valve receives the liquids from each of the operatively connected meters and delivers the exactly proportioned liquid flow as a mixture of both liquids.

An advantage of balancing the pressures in the separate liquid streams before and after they separately encounter the volumetric meters affords constancy in delivery through these meters. This would be evidently true where both meters were set to deliver equal amounts of each liquid passing through them. However, the construction in accordance with this disclosure maintains the pressure balance at the meter inlets regardless of any difference in meter settings required for fluid mixtures of widely separated proportions.

By balancing the liquid pressures in the separate supply systems arising, principally, because of the back pressure differential caused by the different delivery settings in the separate meters, it is possible to connect the meters together for inverse regulation. Such connection regulates liquid volume delivery from the meter outlets and by pressure balance between the two supply systems controls meter inlet. Thus the liquid volumes metered for delivery to the vernier adjustment requires very little control, if any, to produce the desired liquid mixture.

The improved system including these features in combination will be described in detail. A particular embodiment will be disclosed showing an operable device for purposes of illustration, although it will be understood that other embodiments differing in detail from that shown and described may be used.

In the drawing forming a part of this application, there is shown an elevational view partly in diagram of an apparatus constructed in accordance with the present invention.

Two separate liquid transmitting systems numbered generally 10 and 12 include separate pumps 14 and 16 to deliver the respective liquids under closely approximating equal pressures to volumetric meters 18 and 20. These pumps if so desired may be combined to operate from one motor. Between the respective pumps and meters of each of the separate systems the pressure regulating by-pass valve 22 is cross-connected.

Before considering the details of the pressure regulating by-pass valve 22, there are additional connections between the two separate liquid carrying systems 10 and 12. A mixing valve 24 connects the outlets 19 and 21 of the meters 18 and 20 and connects to the combined fluid conduit 26 as shown. The vertical rotatable shafts 28 and 30 of the meters 18 and 20 terminate in indicators 32 and 34.

In addition there is a gear means 33 operatively linking the meters 18 and 20 together through interlocking control of their rotating members or shafts 28 and 30 in the illustrated example. Movement transmission means such as gears, sprocket wheels and the like engage shafts 28 and 30 at a convenient point such as 36 and 38 of the drawing. The movement received from these delivery points is combined at a convenient place such as 40 shown here as a transmission assembly. Any means for connecting the operable rotative motion of shafts 28 and 30 in a predetermined ratio is acceptable. As there are many such assemblies well known to those versed in the art, no further details of this element will be given.

The details of the pressure regulating by-pass valve 22 and its position as an hydraulic element connecting the separate liquid conveying systems will be described. Two inlet ports 42 and 44 are connected, by conventional means, to the separate systems 10 and 12 in the pressure stream on the outlet side of the pump or, as noted above, between the pump and the volumetric meters. Two recycling outlet ports 46 and 48 are connected to the respective systems in the stream directed to the inlet side of the pump. These two outlets 46 and 48 are placed in the housing 50 of the valve 22 adjacent their respective system's inlets and are spaced relative thereto and to each other depending upon the permitted longitudinal movement of the free floating plunger 52. Sealing rings 54 and 56 position the plunger and insure proper response to pressure conditions, and avoid mixing of the liquids before passing through the meters.

In operation the pumps 14 and 16 pick up the separate liquids at their inlets and transmit these liquids at substantially equal pressures to the respective volumetric meters 18 and 20. The respective pressures of the two systems 10 and 12 operate on the plunger 52 in the valve 22 in direct response to the pressure variations in these systems. Should these pressures become unbalanced, dislodging the plunger 52 to either end of the housing, the outlet 46 or 48 on the end near the greatest pressure will be increased, permitting that liquid to recycle through the pump creating that pressure.

It will be evident that such response of the plunger 52 removes all liquid supply from the volumetric meter attending the higher pressure system. As there is not sufficient pressure in the lower pressure system to balance the plunger the meters together will deliver no liquid. Return of pressure in the lower pressure side will move the plunger to cover part or all the outlet in the balancing valve housing establishing equivalent pressures on the meter inlets with resultant controlled liquid outlet.

Under normally balanced pressures which are sought to be maintained in the separate systems, like liquid pressures are effective on the inlet sides of the respective meters. The mix-ratio of the liquids in the systems is established by controlling the liquid flow through the meters. By selecting the transmission ratio permitting the shafts 28 and 30 to rotate at relative speeds for the chosen mix, the two liquids are delivered in pre-selected ratio.

It will be evident that there are many possible mixes of the two liquids in the separate systems. Where both meters, selected for equal, uniform delivery, are operating at full capacity, the delivered mix will contain 50% of each liquid. Under this delivery condition, the pumps will be creating approximately equal pressures which will be balanced by valve 22 functioning between the two systems.

Where one liquid is to be delivered at a fraction of the other, the transmission assembly 40 is set at the selected ratio. Thus one meter shaft is constrained to rotate at a fraction of that which continues to turn at full capacity. Because of the connecting means this ratio, once established, is maintained. Any back pressure created in the system feeding the inlet to the restricted meter is absorbed by the balance valve 22 and transmitted to the other system as described. This adjustment can continue until a minimum of pressure is exerted where there is a large recirculation through the maximum pressure pump.

By gearing the meters together any tendency to surge or lag is immediately transmitted to the unaffected meter and overcome. Consequently the percentage mix of the two liquids is flexible and extends over a wide range. Once set at the desired delivery, the mixture will remain constant.

Mixing valve 24 connects the outlets of the separate meters and acts as a vernier for very fine mixture adjustment. The two liquids delivered from the volumetric meter outlets at the selected rates enter opposite sides of any acceptable mixing valve. By manual adjustment the resultant liquid flowing from this valve's outlet can be further limited to the desired mixture proportions.

The combination of elements and their operating characteristics described above indicate specific limitations to exist in the preferred device in order to obtain the best results. Generally, in this system, both meters are of the same impeller type having approximately the same pressure drop across each meter to produce equal flow. With equal inlet and discharge pressures, the meters will deliver approximately equal volumes. A characteristic of the type of meter used here is that the greater the rate of flow through either meter the greater the resistance to flow, or the greater the difference in pressure drop between the inlet and outlet of that meter. Therefore when the inlet and outlet pressures of the two similar meters are the same the rate of flow through one meter can be reduced by an external torque applied to the meter shaft in the direction opposite the direction of normal rotation, or, within limits of the design, the rate of flow can be increased by an external torque applied to the meter shaft in the direction of rotation, which may be up to the point where the externally applied force does not exceed the resistance due solely to friction. Consequently, the shafts of these two similar impeller type meters are connected through a gear train or by chain and gears allowing for different rates of rotation of the individual meters. With the inlet pressures substantially equal as here provided, and outlet pressures approaching equality, the rates of rotation of the separate meters are approximately equal. Then, if so adjusted, the gear train or chain connecting means will exert a restraining torque on one meter and a helping torque on the other. This action tends to equalize the pressure drop across each of the two meters. By means of this nearly equalized pressure drop across the meters and in the meters it is possible to maintain an accurate volumetric measurement ratio relative to each other. This accurate volumetric measurement is in direct proportion to the ratio of the gear connection between meter shafts.

It will be evident to those versed in the art that these performance characteristics of the meters influenced by external mechanical control and internal pressure balance are accurately responsive within operating limits of the meters selected. Those limits are extended by adding the manually controlled mixing valve connecting the meter outlets. Graphical study of the accuracy of two similar impeller type meters of substantially equal characteristics will show the limits of volume handling within which they operate most satisfactorily. Consequently limits above or below this accurate operating area which cannot be adjusted by the mixing valve will require changes in meter size and system design. However, such practical limits are typical in systems like this disclosed, are understood by those who practice the art and so accepted. Therefore the invention described here is one of principles in the use of a combination of elements in general, not delimited by dimensions or by the particular arrangement of the selected embodiment. It is intended that the scope of this patent will be limited only by the attached claims.

What is claimed is:

1. A system for mixing two liquids in predetermined proportions comprising separate conduits for each liquid with pumping means in each conduit adapted to transmit the liquid therethrough at substantially the same pressure, volumetric-impeller type liquid meters of equal characteristics connected to receive the output of the pumping means in each conduit and pass regulated quantities therethrough, liquid mixing means connected to receive the regulated liquid quantities from said meters, transmission means connecting said meters proportionately controlling the liquid delivery from each in desired ratio, a pressure balancing by-pass valve connecting the separate conduits between the pumping means and meters, and recirculating conduits connected to convey the higher pressured liquid under conditions of unbalanced pressure pumping means.

2. A system for mixing two liquids in predetermined proportions comprising separate conduit means for each liquid, separate pumps having inlets and outlets in each of said conduit means, impeller type volumetric meters in each conduit means positioned to pass the separate liquids therethrough as received from the pumps, a mixing valve connecting the outlets of the meters into a common stream, transmission means connecting the impeller elements of the meters proportionately controlling the operation thereof, recycling conduits in each conduit means connecting the inlets and outlets of each of said pumps, respectively, and means responsive to pressures in said separate conduit means connecting the recycling conduits and balancing the pressures in said separate conduit means by controlling the flow of liquid in said recycling conduits.

3. The system of claim 2 further characterized by said means responsive to pressures in said separate conduit means including a body portion apertured to engage the recycling conduits in spaced relation, and a plunger longitudinally movable in said body portion to open and close the recycling conduits in response to pressures in the separate conduit means.

4. A system for continuously mixing two liquids in predetermined proportions comprising separate conduit means for each liquid, a pump for each conduit means of substantially like pressure characteristics, like separate flow responsive meters with impellers in each of said conduit means, pressure balancing means joining the separate liquid carrying conduit means between the separate pumps and flow responsive meters, recirculating conduits connected to the pressure balancing means to return the higher pressuring liquid for repassage through the separate conduit means for unbalanced pressure conditions, mechanical control means connecting the impellers of the meters in relative rotation, and manually controlled mixing means controlling the flow of deliverd liquids from said meters.

5. A system for continuously mixing two liquids in predetermined proportions which comprises inflow conduits for the respective liquids to be mixed, separate pumping means transmitting the liquids through the respective conduits, means operative, in the event of unequal pressures in the separate pumping means, to effect substantial balancing of said pressures and recycle the higher pressured liquid through the attending pumping means, volumetric impeller type liquid meters of equal characteristics receiving liquids from the respective conduits and passing the respective liquids through outlet conduits toward a common outflow conduit, means to adjustably vary the respective volumetric meter speeds to determine the ratio of delivery therefrom of the respective liquids, and a mixing valve between the outlets from the volumetric meters and the common outflow conduit of the volumetric meters, the meters are maintained under liquid pressure for controlled liquid delivery.

6. The system specified in claim 5 in which the said adjustable means comprise transmission means interlocking the shafts of the volumetric meters.

References Cited in the file of this patent

UNITED STATES PATENTS

| | | | |
|---|---|---|---|
| 1,239,617 | Newcombe | Sept. 11, | 1917 |
| 1,926,333 | Fulcher | Sept. 12, | 1933 |
| 2,024,478 | Short | Dec. 17, | 1935 |
| 2,024,480 | Short | Dec. 17, | 1935 |
| 2,145,114 | Gibbs et al | Jan. 24, | 1939 |
| 2,195,005 | Grosvenor et al. | Mar. 26, | 1940 |
| 2,310,677 | Campbell | Feb. 9, | 1943 |
| 2,492,990 | Hanna | Jan. 3, | 1950 |
| 2,664,907 | Lowe | Jan. 5, | 1954 |

FOREIGN PATENTS

| | | | |
|---|---|---|---|
| 639,264 | Germany | Dec. 2, | 1936 |